US012789561B2

(12) United States Patent
Laine et al.

(10) Patent No.: US 12,789,561 B2
(45) Date of Patent: Nov. 10, 2026

(54) DOLLY VEHICLE WITH ADJUSTABLE DRAWBAR MECHANISM

(71) Applicant: Volvo Truck Corporation, Gothenburg (SE)

(72) Inventors: Leo Laine, Härryda (SE); Jesper Blomstrand, Härryda (SE)

(73) Assignee: Volvo Truck Corporation, Gothenburg (SE)

(*) Notice: Subject to any disclaimer, the term of this patent is extended or adjusted under 35 U.S.C. 154(b) by 906 days.

(21) Appl. No.: 17/922,657

(22) PCT Filed: May 11, 2020

(86) PCT No.: PCT/EP2020/062980

§ 371 (c)(1),
(2) Date: Nov. 1, 2022

(87) PCT Pub. No.: WO2021/228350

PCT Pub. Date: Nov. 18, 2021

(65) Prior Publication Data

US 2023/0097576 A1 Mar. 30, 2023

(51) Int. Cl.
*B60D 1/155* (2006.01)
*B60D 1/24* (2006.01)
(Continued)

(52) U.S. Cl.
CPC ............. *B60D 1/155* (2013.01); *B60D 1/242* (2013.01); *B60D 1/44* (2013.01); *B60D 1/46* (2013.01); *B60T 7/20* (2013.01); *B62D 53/0864* (2013.01)

(58) Field of Classification Search
CPC ...................................................... B62D 1/155
See application file for complete search history.

(56) References Cited

U.S. PATENT DOCUMENTS 2,590,962 A 4/1952 Gurton et al.
3,269,750 A 8/1966 Tantlinger
(Continued)

FOREIGN PATENT DOCUMENTS

CN 110383358 A * 10/2019 ............... B60D 1/44
DE 202008017205 U1 3/2009
(Continued)

OTHER PUBLICATIONS

International Search Report and Written Opinion for International Patent Application No. PCT/EP2020/062980, mailed Apr. 1, 2021, 19 pages.

(Continued)

*Primary Examiner* — Kevin Hurley
(74) *Attorney, Agent, or Firm* — Withrow & Terranova, PLLC

(57) ABSTRACT

A drawbar arrangement for a dolly vehicle, the drawbar arrangement comprising a control unit and an adjustable drawbar attached to the dolly vehicle, the adjustable drawbar comprising a front coupling element arranged to be adjusted vertically with respect to a ground plane by the control unit, wherein the control unit is arranged to determine a vertical coupling load associated with the front coupling element, and wherein the control unit is arranged to set a desired vertical coupling load associated with the front coupling element by vertically adjusting the front coupling element when coupled to a towing vehicle unit.

18 Claims, 5 Drawing Sheets

(51) Int. Cl.

| | |
|---|---|
| ***B60D 1/44*** | (2006.01) |
| ***B60D 1/46*** | (2006.01) |
| ***B60T 7/20*** | (2006.01) |
| ***B62D 53/08*** | (2006.01) |

(56) References Cited

U.S. PATENT DOCUMENTS

| | | | | |
|---|---|---|---|---|
| 10,399,800 | B2 | 9/2019 | Kimener et al. | |
| 10,518,831 | B2 | 12/2019 | Wright | |
| 11,443,635 | B2 * | 9/2022 | Blomstrand | B60D 1/46 |
| 2019/0233034 | A1 | 8/2019 | Viele et al. | |
| 2019/0302764 | A1 | 10/2019 | Smith et al. | |

FOREIGN PATENT DOCUMENTS

| | | | | |
|---|---|---|---|---|
| EP | 2484542 | A1 * | 8/2012 | B60D 1/155 |
| WO | 2018162030 | A1 | 9/2018 | |

OTHER PUBLICATIONS

Intention to Grant for European Patent Application No. 20725164.6, mailed Apr. 28, 2025, 28 pages.

* cited by examiner

DOLLY VEHICLE WITH ADJUSTABLE DRAWBAR MECHANISM

This application is a 35 USC 371 national phase filing of International Application No. PCT/EP2020/062980, filed May 11, 2020, the disclosure of which is incorporated herein by reference in its entirety.

TECHNICAL FIELD

The present disclosure relates to heavy-duty vehicles, such as trucks and construction equipment, and in particular to a self-powered dolly vehicle comprising an adjustable drawbar mechanism. Although the invention will be described mainly with respect to semitrailer vehicles and trucks, the invention is not restricted to this particular type of vehicle but may also be used in other types of vehicles such as recreational vehicles.

BACKGROUND

A semitrailer vehicle normally comprises a tractor arranged to tow a trailer unit via a fifth wheel connection. In order to extend the cargo transport ability of the semitrailer vehicle, a dolly vehicle unit can be added to the vehicle combination, which allows for additional trailer units to be towed by the same tractor. A traditional dolly is an unpowered vehicle unit designed for connection to a tractor unit, truck or prime mover vehicle with strong traction power.

Dolly vehicles comprising on-board energy sources such as electric machines and dolly vehicles with one or more steered axles have recently been proposed. Such dolly vehicles can provide additional power to the vehicle combination, thus reducing the traction power requirements imposed on the prime mover vehicle. Electrified dolly vehicles may also reduce overall fuel consumption by the vehicle combination, since they provide a degree of hybridization to conventional diesel-engine powered tractors. Steered-axle dolly vehicles may furthermore be used for improved steering of the vehicle combination, e.g., when negotiating sharp curves.

WO 2018/162030 A1 discloses dolly vehicles with adjustable drawbar mechanisms which enable coupling and decoupling of vehicle units in motion. A long combination vehicle may, for instance, be decoupled into a platoon of vehicle units in order to negotiate a sharp turn.

However, there is a need for further development of self-powered dolly vehicles in order to realize their full potential.

SUMMARY

It is an object of the present disclosure to provide further improved dolly vehicles. This object is at least in part achieved by a drawbar arrangement for a dolly vehicle. The drawbar arrangement comprises a control unit and an adjustable drawbar attached to the dolly vehicle. The adjustable drawbar comprises a front coupling element arranged to be adjusted vertically with respect to a ground plane by the control unit. The control unit is also arranged to determine a vertical coupling load associated with the front coupling element. The control unit is furthermore arranged to set a desired vertical coupling load associated with the front coupling element by vertically adjusting the front coupling element when coupled to a towing vehicle unit.

This way the vertical coupling load of a vehicle combination comprising the dolly vehicle can be adjusted to always be close to the desired coupling load, which is an advantage since a vehicle combination with a coupling load that is maintained close to the desired coupling load is associated with improved performance.

According to aspects, the control unit may be arranged on-board the dolly vehicle or arranged on a towing vehicle unit at least indirectly coupled to the dolly vehicle via the adjustable drawbar. More than one control unit can also be used to control the drawbar arrangement, operating in, e.g., a master-slave configuration.

According to aspects, the desired vertical coupling load is between 4 kN and 6 kN, and preferably about 5 kN. This vertical coupling load improves vehicle handling. The desired coupling load can optionally also be configured dynamically in dependence of driving scenario. For instance, the coupling load can be temporarily increased in order to provide increased traction for improved startability of a vehicle combination.

According to aspects, the drawbar arrangement also comprises one or more vertical load sensors arranged to determine the vertical coupling load. The control unit is arranged to set the desired vertical coupling load based on an output signal from the one or more vertical load sensors and on a pre-determined target vertical load value. This means that the vertical coupling load can be adapted to current vehicle state, comprising aspects such as current cargo load and the like. It is an advantage that the drawbar arrangement is able to dynamically adapt to changes in driving conditions in this manner.

According to aspects, the front coupling element is arranged to be extended and retracted along a longitudinal direction of the drawbar. The adjustable drawbar comprises a mechanical retraction arrangement configured to bias the drawbar in a retraction direction along the longitudinal direction. The mechanical retraction arrangement retracts the drawbar in case something happens, and therefore provides a safety feature. It is an advantage that the retraction arrangement is mechanical, since this means that retraction will happen even in case of electrical power failure.

According to aspects, the front coupling element is arranged to be adjusted along a longitudinal direction of the drawbar when coupled to the towing vehicle unit. The control unit is then arranged to retract the drawbar to a retracted position when a longitudinal velocity of the dolly vehicle is above a high speed threshold. This retracted mode of operation reduces air drag, which is an advantage. The control unit is optionally also arranged to extend the drawbar to an extended position when a longitudinal velocity of the dolly vehicle is below a low speed threshold. This extended mode of operation improves vehicle handling. For instance, it allows a vehicle combination to negotiate sharper turns compared to when the drawbar is in the retracted position.

The features relating to extending and retracting the drawbar in order to change properties of a combination vehicle can also be used separately. In this case the features can be controlled based on first and second control signals generated by the control unit, or from a manual control input device.

According to aspects, the front coupling element is arranged to be extended and retracted along a longitudinal direction of the drawbar when coupled to the towing vehicle unit. The control unit is arranged to generate a forward motion by the dolly vehicle along a track, by repeatedly: engaging wheel brakes on the dolly vehicle and releasing wheel brakes on all vehicle units coupled to the dolly vehicle via the drawbar, extending the drawbar, releasing the wheel brakes on the dolly vehicle and on all vehicle units coupled to the dolly vehicle via a fifth wheel connection of the dolly vehicle, and engaging wheel brakes on at least one vehicle unit coupled to the dolly vehicle via the drawbar, and retracting the drawbar.

Thus, the drawbar arrangement can be used to move a vehicle combination forward in case of, e.g., motor failure in a worm-like fashion. This is an advantage since the vehicle combination can be moved a distance away from a dangerous location in case something happens to, e.g., the normal vehicle propulsion mechanisms. A dolly vehicle comprising the drawbar arrangement may also use this worm drive to transport itself shorter distances, e.g., during coupling operations, docking operations, and the like. A similar procedure can also be used to reverse a vehicle comprising the drawbar arrangement.

There is also disclosed methods, computer programs, computer readable media, computer program products, control units and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
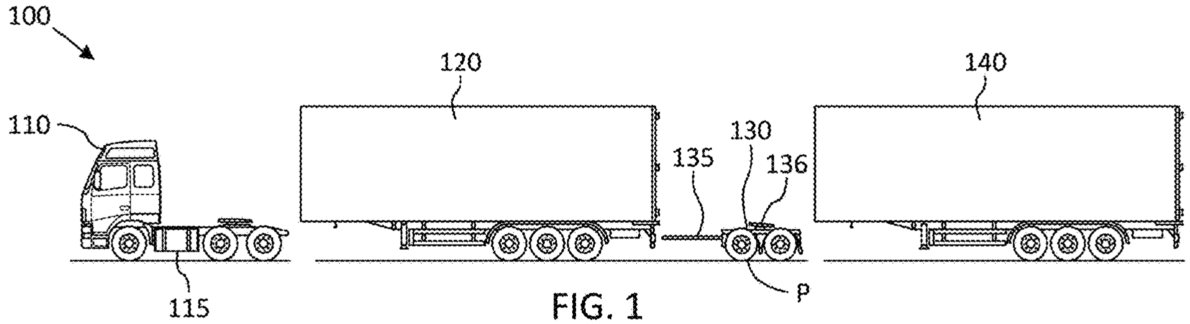
FIG. 1 schematically illustrates a vehicle combination comprising a dolly vehicle.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates an example vehicle combination 100 for cargo transport. The vehicle combination 100 comprises a truck or towing vehicle 110 supported on wheels, at least some of which are driven wheels 115. The truck 110 is configured to tow a first trailer unit 120 in a known manner. To extend the cargo transport capability of the vehicle combination, a dolly vehicle 130 can be connected to the rear of the first trailer 120 via a drawbar 135. This dolly vehicle can then tow a second trailer 140. More than one dolly vehicle can be used to tow additional trailer units in long vehicle combinations.

A dolly vehicle 130 is traditionally a passive vehicle comprising no driven or steerable axles. It has recently been shown that self-powered steerable dolly vehicles may provide both increased fuel efficiency and maneuverability, see, e.g., U.S. Pat. No. 10,518,831 B2. Increased fuel efficiency is for instance obtained if an electric machine arranged for regenerative braking is installed in the dolly vehicle. The vehicle combination then effectively becomes a hybrid electric vehicle, even if the towing vehicle only comprises a traditional diesel engine with no on-board electric hybridization.

Figure 2:
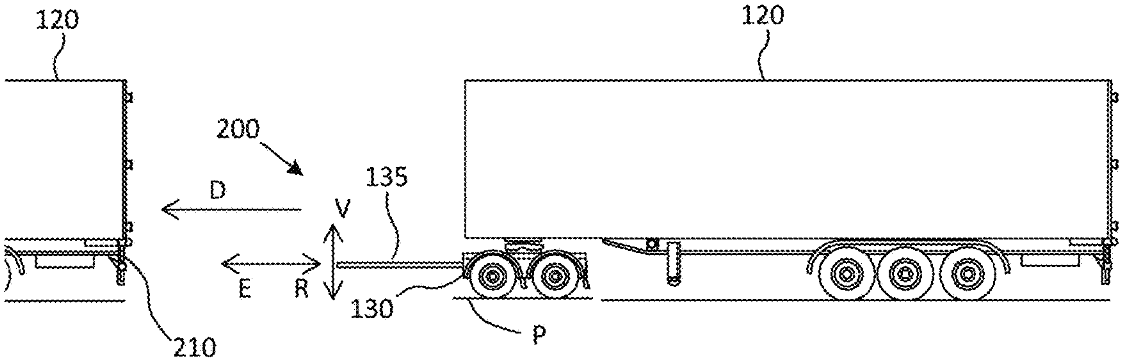
FIG. 2 shows a coupling operation involving a dolly vehicle.

FIG. 2 illustrates a vehicle combination where the dolly vehicle 130 comprises an adjustable drawbar arrangement 200 can be adjusted vertically V with respect to some ground plane P. The drawbar 135 can also be extended E and retracted R. This way the drawbar can be adjusted to mate with a coupling element 210 on a vehicle unit such as the first trailer 120. This mating can in fact be performed also during motion D. A system for coupling and decoupling trailer units during motion was discussed in WO 2018/162030 A1. WO 2018/162030 A1 also discusses various adjustable drawbar mechanisms.

Figure 3:
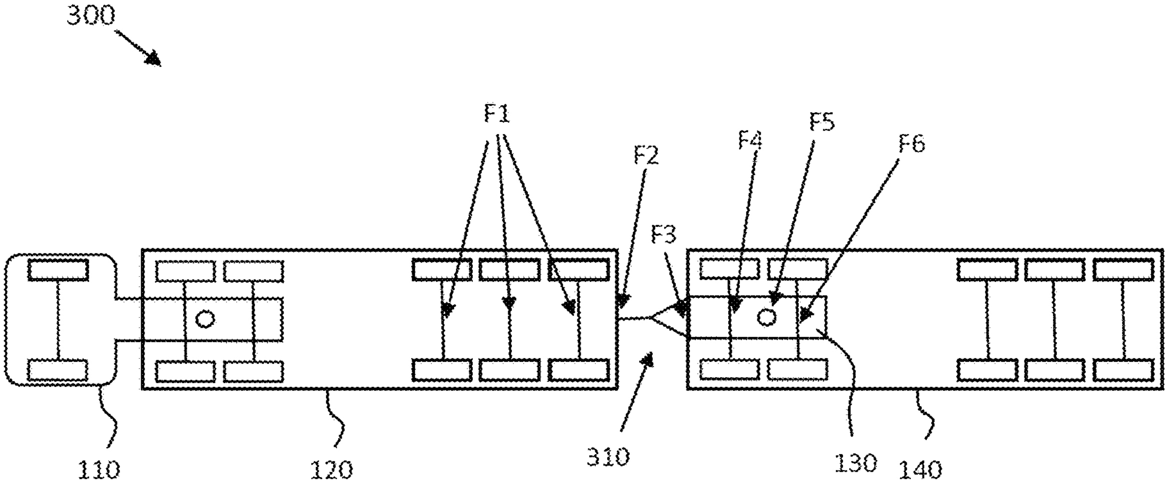
FIG. 3 illustrates coupling forces acting on vehicle units.

FIG. 3 schematically illustrates a combination vehicle 300 comprising a truck 110, a first trailer 120, and a second trailer 140. A dolly vehicle 130 is arranged between first and second trailers. FIG. 3 also illustrates some important forces acting on vehicle parts and sections which contribute to determining, among other things, the dynamic properties of the vehicle combination and also the overall vehicle handling characteristics. In order to ensure both that the desired vehicle handling properties and vehicle stability is obtained, it is important to maintain a proper balance between trailer rear axle forces F1, the vertical coupling load F2 associated with the coupling element on the first trailer 120, the vertical load on the drawbar attachment brackets F3, the fifth wheel vertical load F5, and the dolly vehicle axle loads F6. These loads and forces are of course affected by external factors such as cargo load and distribution, and also by the current driving scenario.

The drawbar arrangements discussed herein comprises control units configured to control an adjustable drawbar attached to the dolly vehicle 130. This adjustable drawbar may, e.g., be a drawbar similar to those discussed in WO 2018/162030 A1. The adjustable drawbar comprises a front coupling element, such as a drawbar eye or the like, which is arranged to be adjusted vertically V with respect to a ground plane P by the control unit. The control unit is arranged to determine at least the vertical coupling load F2 associated with the coupling element to which the drawbar is attached, and to set a desired vertical coupling load associated with the front coupling element by vertically adjusting the front coupling element when coupled, i.e., mechanically connected, to a towing vehicle unit such as the first trailer 120.

An example control unit 1000 will be discussed below in connection to FIG. 10. The control unit may, e.g., be arranged on-board the dolly vehicle 130, or it can be comprised in a towing vehicle unit 110, 120 at least indirectly coupled to the dolly vehicle 130 via the adjustable drawbar. This potentially indirect coupling may be a wireless data link or a wired data link.

The control unit may be part of a vehicle motion management system that controls, among other things, vehicle stability. The control unit has access to data associated with the coupling loads and is therefore able to adjust the coupling load to be close to the desired coupling load.

Figure 4:
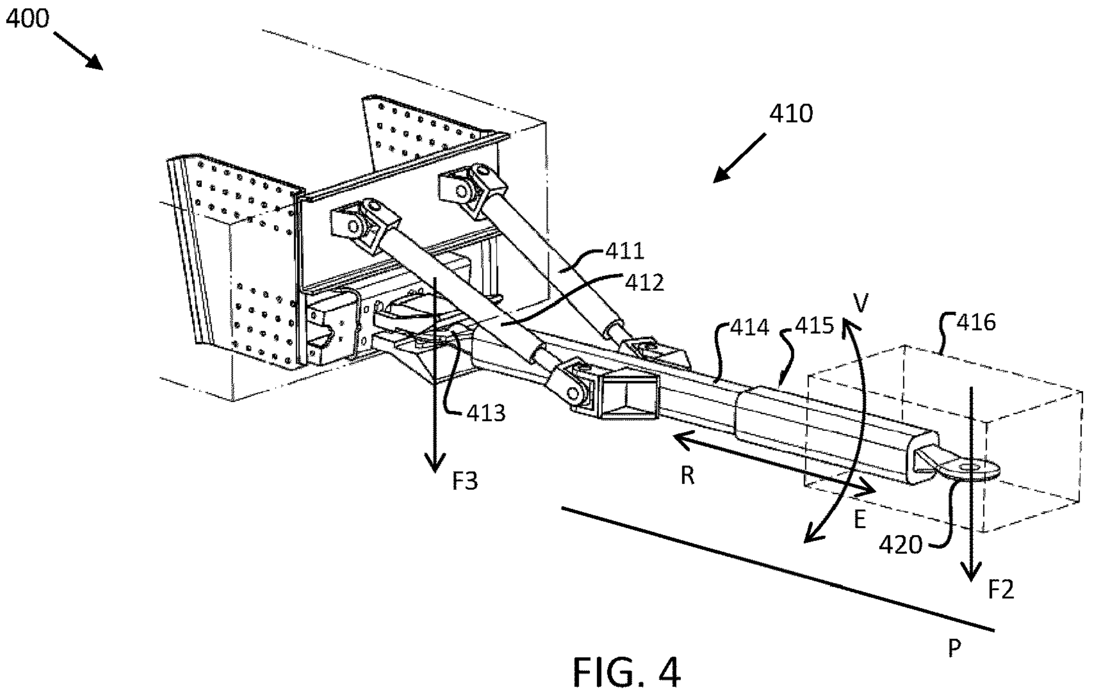
FIG. 4 shows an example adjustable drawbar.

FIG. 4 shows an example of an adjustable drawbar 410. The vertical coupling load F2 is shown in connection to the front coupling element 420. The load F3 on the drawbar attachment point 413 is also indicated in FIG. 4. This example drawbar 410 comprises vertical adjustment means 411,412 for adjusting the drawbar vertically V, and also means for extending E and retracting R the drawbar. Thus, the front coupling element 420 can be adjusted in a three-dimensional region 416. The vertical adjustment means 411, 412 are here shown as hydraulic cylinders, i.e., hydraulic actuators, but other options are certainly possible. For instance, the front coupling element 420 may be arranged to be adjusted vertically V with respect to the ground plane P by an active suspension system comprised in the dolly vehicle 130. This active suspension system can be used to raise and to lower the dolly vehicle frame, and thereby control the drawbar arrangement in the vertical dimension.

The front coupling element 420 may also be arranged to be adjusted vertically V with respect to the ground plane P by an electric motor and a rack and pinion arrangement comprised in the dolly vehicle 130.

When the drawbar is connected to some other vehicle unit via the front coupling element 420, the different loads and forces discussed in connection to FIG. 3 can be adjusted by the vertical adjustment means. This adjustment is, by the disclosed methods, performed in order to obtain a desired vertical coupling load associated with the front coupling element. This desired vertical coupling load may be fixedly configured or dynamically adapted during vehicle operation in order to obtain a desired vehicle property. For instance, improved startability may be obtained by changing trailer rear axle loads to put more weight on the driven wheels 115. A desired vertical coupling load during normal driving operation is, according to some aspects, between 4 kN and 6 kN, and preferably about 5 kN for some vehicle types.

Optionally, the drawbar arrangement comprises one or more vertical load sensors arranged to determine the vertical coupling load F2. The control unit is then able to measure a current vertical coupling load, and set the desired vertical coupling load based on an output signal from the one or more vertical load sensors and on a pre-determined target vertical load value. This way a desired vertical load value can be maintained even during changing external conditions, such as during loading of different types and amounts of cargo.

The drawbar arrangements discussed herein may optionally be extended E and retracted R along a longitudinal direction of the drawbar, i.e., in the extension direction of the drawbar indicated in FIG. 4. The adjustable drawbar may comprise a mechanical retraction arrangement configured to bias the drawbar in a retraction direction R along the longitudinal direction. Thus, if something goes wrong, such as the dolly vehicle suffering an electrical power outage or the like, the drawbar will be automatically retracted and therefore be in a less dangerous position compared to if it is fully extended.

Figure 8:
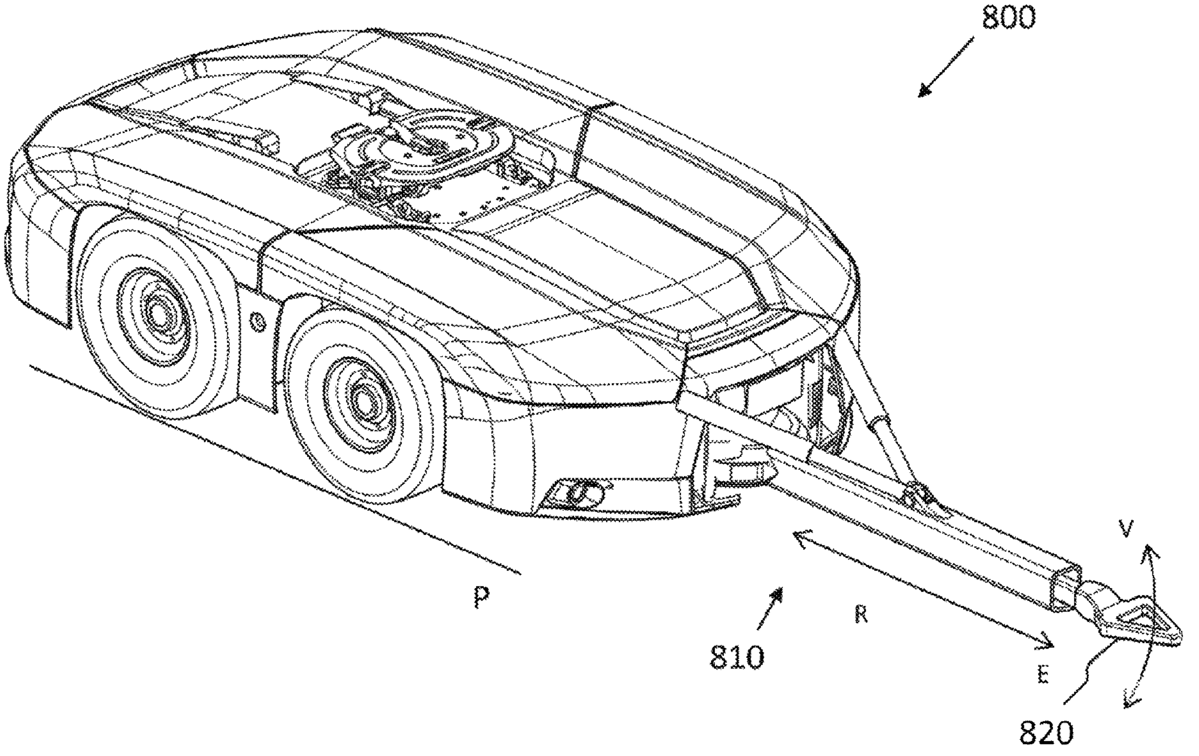
FIG. 8 shows an example dolly vehicle with an adjustable drawbar.

FIG. 8 illustrates an example dolly vehicle 800 according to the present disclosure. The dolly vehicle comprises a drawbar arrangement 810 arranged to be adjusted vertically V with respect to a ground plane P by a control unit, such as the control unit 1000 schematically illustrated in FIG. 10. The control unit is arranged to determine at least the vertical coupling load F2 associated with the coupling element to which the drawbar is attached, and to set a desired vertical coupling load associated with the front coupling element by vertically adjusting the front coupling element when coupled, i.e., mechanically connected, to a towing vehicle unit such as the first trailer 120. The drawbar is also arranged to be extended E and to be retracted R along an extension direction of the drawbar. As will be discussed below in connection to FIGS. 5 and 6, this extension and retraction feature can be controlled by the vehicle motion management system, i.e., by the control unit, in order to reduce air drag at higher vehicle speeds, and also to reduce swept area during turning at lower speeds. The extension and retraction feature may of course also be manually controlled from a manual control input device arranged, e.g., in the driver cabin.

Figure 5:
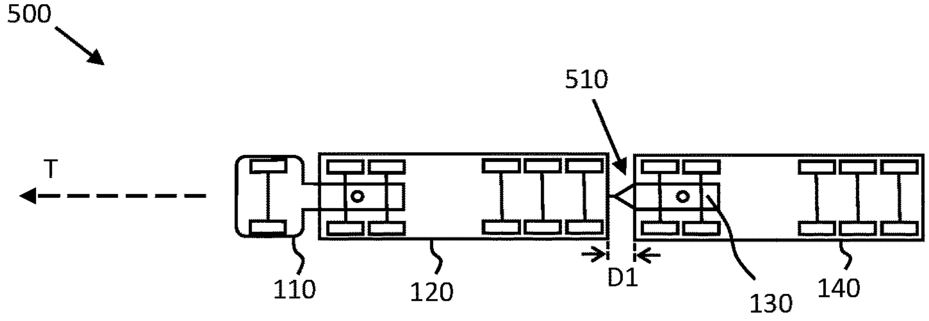
FIG. 5 schematically illustrates a high speed driving scenario.

FIG. 5 illustrates an example scenario 500 where a vehicle combination comprising a dolly vehicle 130 is driving at relatively high speed along a track T, such as a straight track on a highway. In this type of scenario it is often desired to reduce air resistance, i.e., to reduce air drag. Air resistance can be reduced by retracting the adjustable drawbar arrangement in a controlled manner to make the distance D1 between the dolly vehicle 130 and the first trailer 120 smaller. Thus, according to some aspects, the front coupling element 420 is arranged to be adjusted along a longitudinal direction of the drawbar when coupled to a towing vehicle unit such as the first trailer 120. The control unit is arranged to retract the drawbar to a retracted position when a longitudinal velocity of the dolly vehicle is above a high speed threshold. Additionally, the retraction can be conditioned on that the magnitude of an articulation angle of the vehicle combination is below some threshold. Both the speed threshold and the articulation angle threshold can be adapted according to driving scenario and also to vehicle type. The retraction of the drawbar to reduce air drag may also be performed manually by, e.g., a driver operating a manual control to retract the drawbar when the vehicle enters a freeway driving scenario. Too large articulation angles may be prevented by the control unit 1000 when the drawbar is in the retracted position to reduce air drag, since this may cause trailer vehicle rear corners to contact dolly vehicle front corners.

Figure 6:
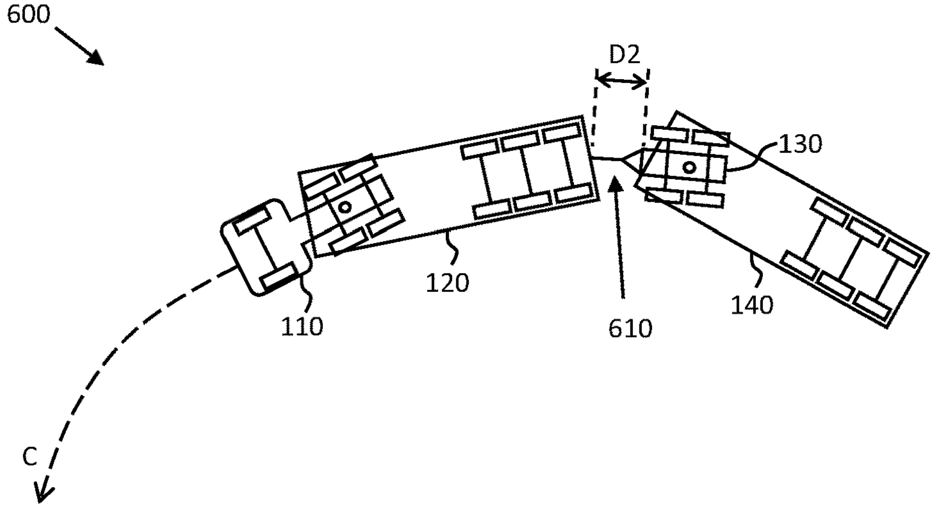
FIG. 6 illustrates an example scenario where a vehicle combination is driving at reduced speed.

FIG. 6 instead illustrates an example scenario 600 where a vehicle combination is driving at reduced speed, and where it is desired to negotiate a relatively sharp curve C. Here, it is more advantageous to have a longer drawbar since this improves the ability to drive through curves with a reduced swept area. The front coupling element 420 is optionally also arranged to extend the drawbar to an extended position when a longitudinal velocity of the dolly vehicle is below a low speed threshold. Again, the particular thresholds involved can be configured fixedly or updated dynamically. The extending of the drawbar can also be performed manually by, e.g., a driver using a control device arranged in the cabin of the truck.

To summarize, FIGS. 5 and 6 illustrate a drawbar arrangement for a dolly vehicle. The drawbar arrangement comprises a control unit or a manual control input device and an adjustable drawbar attached to the dolly vehicle. The control unit will be discussed in more detail below in connection to FIG. 10. The manual control input device may, e.g., be a button or control lever arranged in the driver cabin of a towing truck where it is accessible by the driver.

The adjustable drawbar is arranged to be extended in response to a first control signal from the control unit or in response to a first control signal from the manual control input in a high speed driving scenario to reduce air drag associated with the dolly vehicle.

The adjustable drawbar is also arranged to be retracted in response to a second control signal from the control unit or in response to a second control signal from the manual control input in a low speed driving scenario to reduce a swept area associated with the dolly vehicle.

Figure 7A:
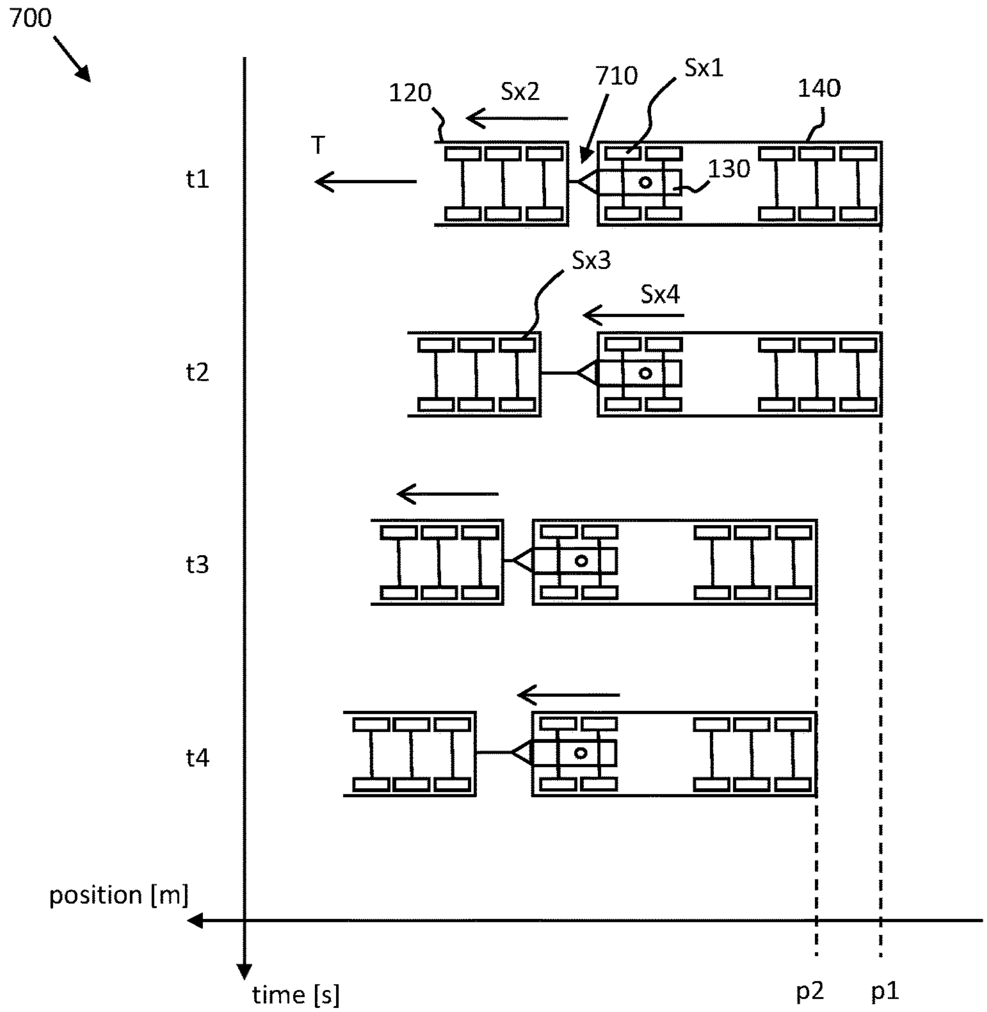
FIGS. 7A-B schematically illustrates a dolly vehicle worm drive operation.
Figure 7B:
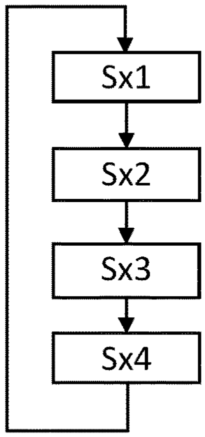

The feature of being able to extend and to retract the drawbar mechanism can also be used to move a vehicle combination both forward and backwards in a worm-like manner. FIGS. 7A and 7B illustrate this procedure. With reference to FIG. 7A, which illustrates dolly vehicle position in meters on the x-axis and time in seconds on the y-axis, a dolly vehicle 130 may move forward by first locking, i.e., applying brakes, to the front and/or rear axle wheels on the dolly vehicle (or on any vehicle rearwards from the dolly vehicle). By extending the drawbar, the vehicle units in front of the dolly vehicle are pushed forward a short distance. One or more pairs of wheels on the vehicle units in front of the dolly vehicle are then braked, and the drawbar is retracted. This pulls the dolly vehicle (and also any vehicle units rearwards from the dolly vehicle) forward a short distance. The process is then repeated, whereupon the vehicle combination slowly moves forward. Extending and retracting the drawbar can be accomplished by, e.g., hydraulics or rack and pinion mechanisms. A control unit arranged to control brakes in the vehicle combination and the features on the dolly vehicle coordinates the procedure.

The same approach can of course also be used to move backwards by reversing the steps illustrated in FIG. 7A.

The procedure may be used with advantage to move a vehicle combination away from a dangerous location in case the main propulsion brakes down. The procedure can also be used with advantage to move a vehicle combination a short distance during, e.g., docking maneuvers and when moving a trailer up to a loading bay or the like.

To summarize, FIG. 7A illustrates a procedure involving a drawbar arrangement where the front coupling element is arranged to be extended and retracted along a longitudinal direction of the drawbar when coupled to the towing vehicle unit 120. A control unit is arranged to generate a forward motion by the dolly vehicle 130 along a track, by repeatedly: engaging wheel brakes on the dolly vehicle 130 and releasing wheel brakes on all vehicle units 110, 120 coupled to the dolly vehicle 130 via the drawbar 135, i.e., in front of the dolly vehicle, extending the drawbar, releasing the wheel brakes on the dolly vehicle 130 and on all vehicle units 140 coupled to the dolly vehicle via a fifth wheel connection 136 of the dolly vehicle, and engaging wheel brakes on at least one vehicle unit 110, 120 coupled to the dolly vehicle via the drawbar, and retracting the drawbar.

With reference also to FIG. 8, FIG. 7B illustrates methods corresponding to the procedures illustrated in FIG. 7A, i.e., a method for generating a forward motion by the dolly vehicle 130 along a track T. The dolly vehicle comprises an adjustable drawbar arrangement 310, 410, 510, 610, 710, 810 with an adjustable drawbar comprising a front coupling element 420, 820, wherein the front coupling element 420, 820 is arranged to be extended and retracted along a longitudinal direction of the drawbar when coupled to a towing vehicle unit 120, the method comprising, repeatedly: engaging Sx1 wheel brakes on the dolly vehicle 130 and releasing wheel brakes on all vehicle units 110, 120 coupled to the dolly vehicle 130 via the drawbar 135, extending Sx2 the drawbar, releasing Sx4 the wheel brakes on the dolly vehicle 130 and on all vehicle units 140 coupled to the dolly vehicle via a fifth wheel connection 136 of the dolly vehicle, and engaging wheel brakes on at least one vehicle unit 110, 120 coupled to the dolly vehicle via the drawbar, and retracting Sx5 the drawbar.

The method steps can also be performed in reverse order for reversing the vehicle combination, i.e., repeatedly: releasing Sx4 the wheel brakes on the dolly vehicle 130 and on all vehicle units 140 coupled to the dolly vehicle via a fifth wheel connection 136 of the dolly vehicle, and engaging wheel brakes on at least one vehicle unit 110, 120 coupled to the dolly vehicle via the drawbar, extending Sx2 the drawbar, engaging Sx1 wheel brakes on the dolly vehicle 130 and releasing wheel brakes on all vehicle units 110, 120 coupled to the dolly vehicle 130 via the drawbar 135, and retracting Sx5 the drawbar.

Figure 9:
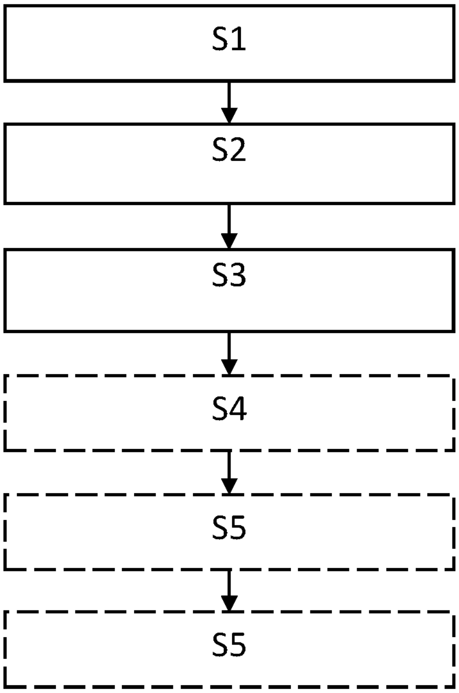
FIG. 9 is a flow chart illustrating methods.

FIG. 9 is a flowchart illustrating methods which summarize the discussions above. There is shown a method for controlling a dolly vehicle 130 comprising an adjustable drawbar arrangement 310, 410, 510, 610, 710, 810 with an adjustable drawbar comprising a front coupling element 420, 820 arranged to be adjusted vertically V with respect to a ground plane P. The method comprises coupling S1 the dolly vehicle 130 to a towing vehicle 120 via the front coupling element 420, 820, determining S2 a current vertical coupling load, and setting S3 a desired vertical coupling load associated with the front coupling element by vertically adjusting the front coupling element 420, 820.

According to some aspects, the front coupling element 420, 820 is arranged to be adjusted along a longitudinal direction of the drawbar when coupled to a towing vehicle unit 120. The method then also comprises determining S4 a longitudinal velocity of the dolly vehicle 130, and retracting S5 the drawbar to a retracted position if the longitudinal velocity of the dolly vehicle 130 is above a high speed threshold or in response to a first control signal. An example of this type of operation was discussed above in connection to FIG. 5.

According to some other aspects, the front coupling element 420, 820 is arranged to be adjusted along a longitudinal direction of the drawbar when coupled to the towing vehicle unit 120. In this case the method comprises determining S4 the longitudinal velocity of the dolly vehicle 130 and extending S6 the drawbar to an extended position if the longitudinal velocity of the dolly vehicle 130 is below a low speed threshold or in response to a second control signal. An example of this type of operation was discussed above in connection to FIG. 6.

Figure 10:
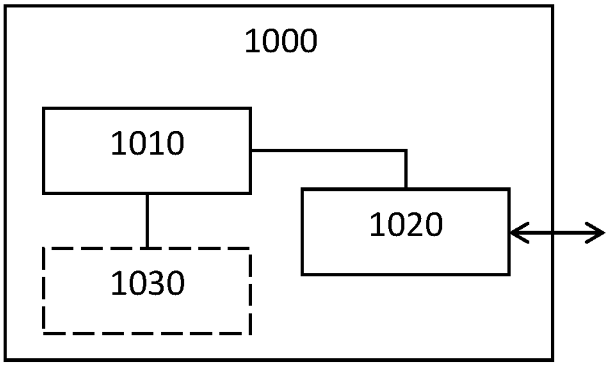
FIG. 10 schematically illustrates a control unit.

FIG. 10 schematically illustrates, in terms of a number of functional units, the components of the control unit 1000 discussed above. This control unit 1000 may be comprised in the vehicle 130, e.g., in the form of a VMM unit. Processing circuitry 1010 is provided using any combination of one or more of a suitable central processing unit CPU, multiprocessor, microcontroller, digital signal processor DSP, etc., capable of executing software instructions stored in a computer program product, e.g. in the form of a storage medium 1030. The processing circuitry 1010 may further be provided as at least one application specific integrated circuit ASIC, or field programmable gate array FPGA.

Particularly, the processing circuitry 1010 is configured to cause the control unit 1000 to perform a set of operations, or steps, such as the methods discussed in connection to FIG. 10. For example, the storage medium 1030 may store the set of operations, and the processing circuitry 1010 may be configured to retrieve the set of operations from the storage medium 1030 to cause the control unit 1000 to perform the set of operations. The set of operations may be provided as a set of executable instructions. Thus, the processing circuitry 1010 is thereby arranged to execute methods as herein disclosed.

The storage medium 1030 may also comprise persistent storage, which, for example, can be any single one or combination of magnetic memory, optical memory, solid state memory or even remotely mounted memory.

The control unit 1000 may further comprise an interface 1020 for communications with at least one external device. As such the interface 1020 may comprise one or more transmitters and receivers, comprising analogue and digital components and a suitable number of ports for wireline or wireless communication.

The processing circuitry 1010 controls the general operation of the control unit 1000, e.g., by sending data and control signals to the interface 1020 and the storage medium 1030, by receiving data and reports from the interface 1020, and by retrieving data and instructions from the storage medium 1030. Other components, as well as the related functionality, of the control node are omitted in order not to obscure the concepts presented herein.

Figure 11:
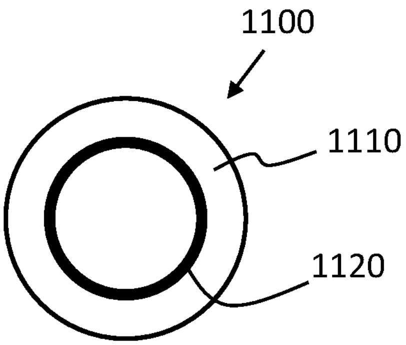
FIG. 11 shows an example computer program product.

FIG. 11 illustrates a computer readable medium 1110 carrying a computer program comprising program code means 1120 for performing, e.g., the methods illustrated in FIG. 11, when said program product is run on a computer. The computer readable medium and the code means may together form a computer program product 1100.

The invention claimed is:

1. A drawbar arrangement for a dolly vehicle, the drawbar arrangement comprising a control unit and an adjustable drawbar attached to the dolly vehicle, wherein the adjustable drawbar comprises a front coupling element arranged to be adjusted vertically with respect to a ground plane by the control unit, wherein the control unit is arranged to determine a vertical coupling load associated with the front coupling element, and wherein the control unit is arranged to set a desired vertical coupling load associated with the front coupling element by vertically adjusting the front coupling element when coupled to a towing vehicle unit.

2. The drawbar arrangement of claim 1, wherein the control unit is arranged on-board the dolly vehicle.

3. The drawbar arrangement of claim 1, wherein the control unit is arranged on a towing vehicle unit at least indirectly coupled to the dolly vehicle via the adjustable drawbar.

4. The drawbar arrangement of claim 1, wherein the desired vertical coupling load is between 4 kN and 6 kN.

5. The drawbar arrangement of claim 1, further comprising one or more vertical load sensors arranged to determine the vertical coupling load, wherein the control unit is arranged to set the desired vertical coupling load based on an output signal from the one or more vertical load sensors and on a predetermined target vertical load value.

6. The drawbar arrangement of claim 1, wherein the front coupling element is arranged to be extended and retracted along a longitudinal direction of the drawbar, and wherein the adjustable drawbar comprises a mechanical retraction arrangement configured to bias the drawbar in a retraction direction along the longitudinal direction.

7. The drawbar arrangement of claim 1, wherein the front coupling element is arranged to be adjusted vertically with respect to the ground plane by an active suspension system comprised in the dolly vehicle.

8. The drawbar arrangement of claim 1, wherein the front coupling element is arranged to be adjusted vertically with respect to the ground plane by a hydraulic actuator comprised in the dolly vehicle.

9. The drawbar arrangement of claim 1, wherein the front coupling element is arranged to be adjusted vertically with respect to the ground plane by an electric motor and a rack and pinion arrangement comprised in the dolly vehicle.

10. The drawbar arrangement of claim 1, wherein the front coupling element is arranged to be adjusted along a longitudinal direction of the drawbar when coupled to the towing vehicle unit, and wherein the control unit is arranged to retract the drawbar to a retracted position when a longitudinal velocity of the dolly vehicle is above a high-speed threshold or in response to a first control signal or in response to input from a manual control input device.

11. The drawbar arrangement of claim 1, wherein the front coupling element is arranged to be adjusted along a longitudinal direction of the drawbar when coupled to the towing vehicle unit, and wherein the control unit is arranged to extend the drawbar to an extended position when a longitudinal velocity of the dolly vehicle is below a low-speed threshold or in response to a second control signal or in response to input from a manual control input device.

12. The drawbar arrangement of claim 1, wherein the front coupling element is arranged to be extended and retracted along a longitudinal direction of the drawbar when coupled to the towing vehicle unit, and wherein the control unit is arranged to generate a forward motion by the dolly vehicle along a track, by repeatedly:

engaging wheel brakes on the dolly vehicle and releasing wheel brakes on all vehicle units coupled to the dolly vehicle via the drawbar, extending the drawbar, releasing the wheel brakes on the dolly vehicle and on all vehicle units coupled to the dolly vehicle via a fifth wheel connection of the dolly vehicle, and engaging wheel brakes on at least one vehicle unit coupled to the dolly vehicle via the drawbar, and retracting the drawbar.

13. The drawbar arrangement of claim 1, wherein the front coupling element is arranged to be extended and retracted along a longitudinal direction of the drawbar when coupled to the towing vehicle unit, and wherein the control unit is arranged to generate a reverse motion by the dolly vehicle along a track, by repeatedly:

releasing the wheel brakes on the dolly vehicle and on all vehicle units coupled to the dolly vehicle via a fifth wheel connection of the dolly vehicle, and engaging wheel brakes on at least one vehicle unit coupled to the dolly vehicle via the drawbar, extending the drawbar, engaging wheel brakes on the dolly vehicle and/or on all vehicle units coupled to the dolly vehicle via a fifth wheel connection of the dolly vehicle, and releasing wheel brakes on all vehicle units coupled to the dolly vehicle via the drawbar, and retracting the drawbar.

14. The drawbar arrangement of claim 1, wherein the desired vertical coupling load is 5 kN.

15. A method for controlling a dolly vehicle, comprising:

coupling the dolly vehicle to a towing vehicle via a front coupling element of an adjustable drawbar of a drawbar arrangement, the front coupling element arranged to be adjusted vertically with respect to a ground plane by a control unit of the drawbar arrangement, determining, by the control unit, a current vertical coupling load associated with the front coupling element, and setting, by the control unit, a desired vertical coupling load associated with the front coupling element by vertically adjusting the front coupling element.

16. The method of claim 15, wherein the front coupling element is arranged to be adjusted along a longitudinal direction of the drawbar when coupled to a towing vehicle unit, the method comprising:

determining a longitudinal velocity of the dolly vehicle, and retracting the drawbar to a retracted position if the longitudinal velocity of the dolly vehicle is above a high-speed threshold or in response to a first control signal.

17. The method of claim 15, wherein the front coupling element is arranged to be adjusted along a longitudinal direction of the drawbar when coupled to the towing vehicle unit, the method comprising:

determining the longitudinal velocity of the dolly vehicle, and extending the drawbar to an extended position if the longitudinal velocity of the dolly vehicle is below a low speed threshold or in response to a second control signal.

18. A control unit comprising processing circuitry configured to perform the method of claim 15.

* * * * *